United States Patent [19]
Hartman

[11] Patent Number: 6,139,032
[45] Date of Patent: Oct. 31, 2000

[54] GOLF CART

[75] Inventor: Marvin H. Hartman, Glendora, Calif.

[73] Assignee: The Hartman Trust, Glendora, Calif.

[21] Appl. No.: 09/218,295

[22] Filed: Dec. 22, 1998

[51] Int. Cl.$^7$ .................................................. B62B 1/00
[52] U.S. Cl. ................................. 280/32.7; 280/DIG. 5; 180/15; 297/195.11; 297/215.11
[58] Field of Search ........................... 180/15, 16, 907; 280/304.1, DIG. 6, DIG. 5, 204, 32.7; 297/195.1, 195.11, 215.1, 215.11, 440.15, 440.16

[56] References Cited

U.S. PATENT DOCUMENTS

| | | | |
|---|---|---|---|
| 2,784,769 | 3/1957 | Fisher | 297/440.15 |
| 3,190,672 | 6/1965 | Swanson et al. | 280/32.7 |
| 3,513,924 | 5/1970 | Jackson | 280/DIG. 5 |
| 4,708,219 | 11/1987 | Cresswell | 180/907 |
| 4,757,868 | 7/1988 | Cresswell | 180/907 |
| 4,861,058 | 8/1989 | Cresswell | 180/907 |
| 5,277,267 | 1/1994 | Tiffany et al. | 280/DIG. 5 |
| 5,785,453 | 7/1998 | Marty et al. | 280/32.7 |
| 6,059,309 | 5/2000 | Munnoch et al. | 280/32.7 |

*Primary Examiner*—Lanna Mai
*Assistant Examiner*—Ruth Ilan
*Attorney, Agent, or Firm*—Elliott N. Kramsky

[57] ABSTRACT

Apparatus for converting a conventional battery-powered golf bag cart to a vehicle for transporting a golfer. Such apparatus includes a frame engageable to the chassis of the cart. Such frame is configured to support a seat for supporting a golfer. Wheels are rotatably engaged to opposed ends of an axle fixed to the frame. A bracket is fixed to the frame for securing it to the chassis and for reinforcing the interconnections of the chassis to a frontal nose wheel mount and to a rear control handle.

5 Claims, 3 Drawing Sheets

GOLF CART

BACKGROUND

1. Field of the Invention

The present invention relates to golf carts. More particularly, this invention pertains to a golf cart for transporting both a player and his clubs that is based upon a standard motorized cart for transporting clubs.

2. Description of the Prior Art

So-called "executive" golf courses are often favored by beginners as well as older and retired golfers. Such courses are relatively short and level, enabling their location within easily-accessible urban areas. Such courses are almost always operated by a municipal entity charging relatively-minimal greens fees.

Due to the premium placed upon economy of play, such accessories as golf carts are rarely found at executive courses. Rather, golfers are limited to hand and battery-powered carts for assistance in transporting their clubs and bags. Due to the generally-regular terrain encountered at such courses, such bag carts are often sufficient for healthy golfers playing those courses. However, as mentioned above, executive courses often appeal to older golfers, some of whom may be hampered by illness or conditions of a degenerative nature that may make the very act of walking the course taxing and energy consuming.

SUMMARY OF THE INVENTION

The preceding and other shortcomings of the prior art are addressed and overcome by the present invention that provides apparatus for converting a battery-powered golf bag cart of the type that includes a chassis having at least one pair of wheels fixed thereto. Such apparatus includes a frame comprising an elongated tubular base. An axle is fixed transverse and at one end of the tubular base. A pair of wheels is rotatably fixed to opposed ends of the axle. A seat structure is fixed to the end of the tubular base while a bracket for engaging the chassis is fixed to the opposed end of the tubular base.

The foregoing and other features and advantages of the present invention shall become further apparent from the detailed description that follows. Such description is accompanied by a set of drawing figures in which numerals, corresponding to numerals of the written description, point to the various features of the invention. Like numerals refer to like features of the invention throughout both the written description and the drawing figures.

BRIEF DESCRIPTION OF THE DRAWING FIGURES

DETAILED DESCRIPTION OF THE PREFERRED EMBODIMENT

Figure 1:
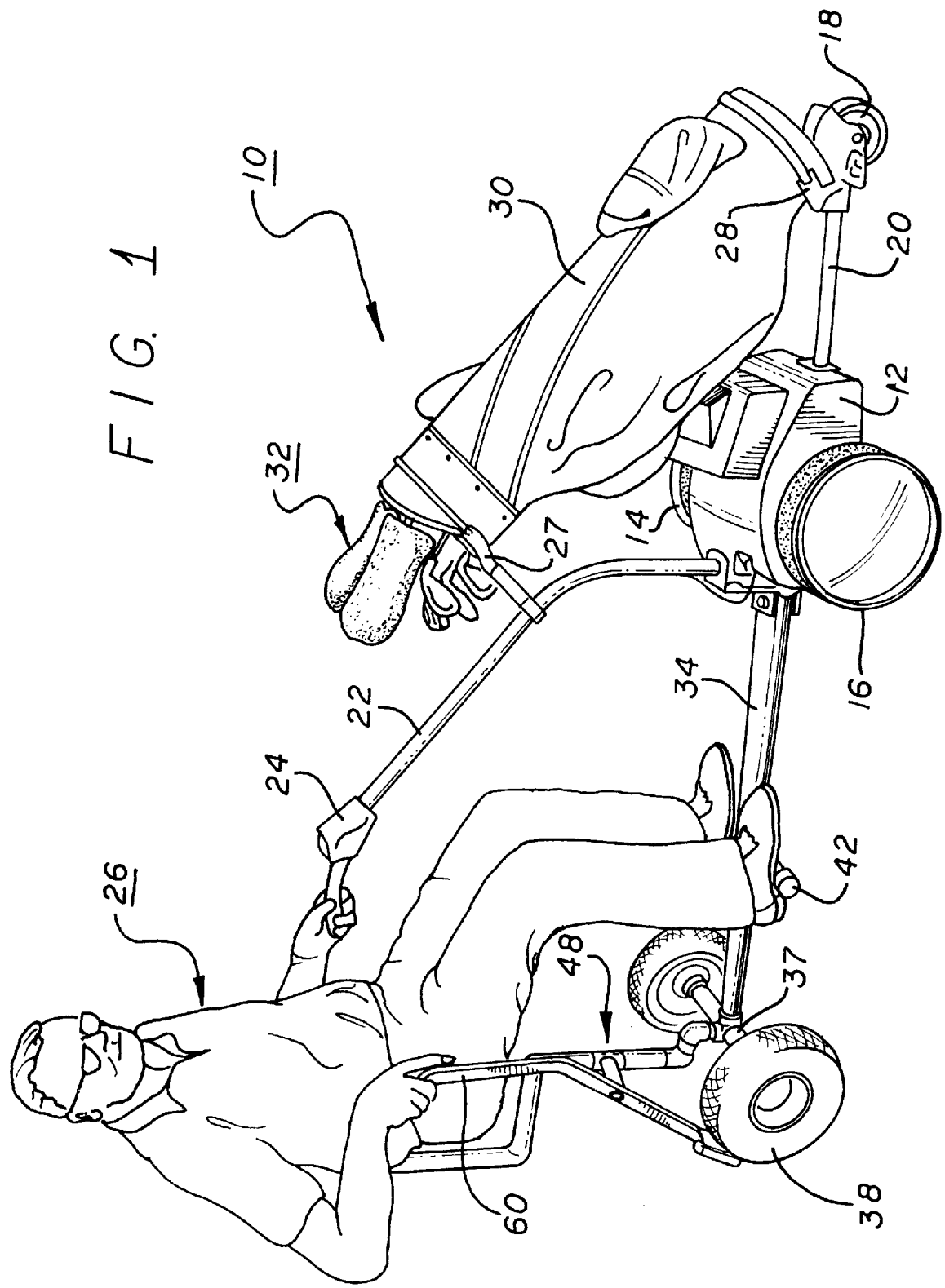
FIG. 1 is a perspective view of the invention engaged to a battery-powered golf bag cart in use.

Turning now to the drawings, FIG. 1 is a perspective view of the invention engaged to a conventional battery powered golf bag cart 10. Such a cart 10, details of which are discussed below, is designed primarily for use on executive golf courses. These courses are not particularly hilly and are often favored by beginners and seniors. The cart 10 includes a chassis 12 that supports both a battery (not shown) and a pair of drive wheels 14, 16 aligned along an axle (not shown). A freely-rotatable nose wheel 18 projects from the front of the chassis 12 at the end of a retractable tubular support 20. A control handle 22 includes an on/off and speed control unit 24 whereby a golfer 26 may control the power output of the cart 10. Brackets 27 and 28 are provided for securing a standard bag 30 of clubs 32 to the cart during travel.

The aforesaid description has been limited to the features and general arrangement of a battery-driven golf bag cart of well-known configuration. Such a cart is marketed, for example, under the trademark "CLUB RUNNER" by Paradigm Sports of Montgomery, Minn. The description has proceeded without reference to the apparatus of the present invention that permits ready conversion of a golf club cart of such type to the additional function of transporting a golfer 26 as indicated in FIG. 1. As can be seen, the golfer 26 is transported with his clubs 32 in an integrated arrangement that permits him to travel stress-free between holes. Golfers, senior or otherwise, afflicted with physical conditions and limitations, such as arthritis or emphysema, may still enjoy the sport despite their disabilities.

Figure 2:
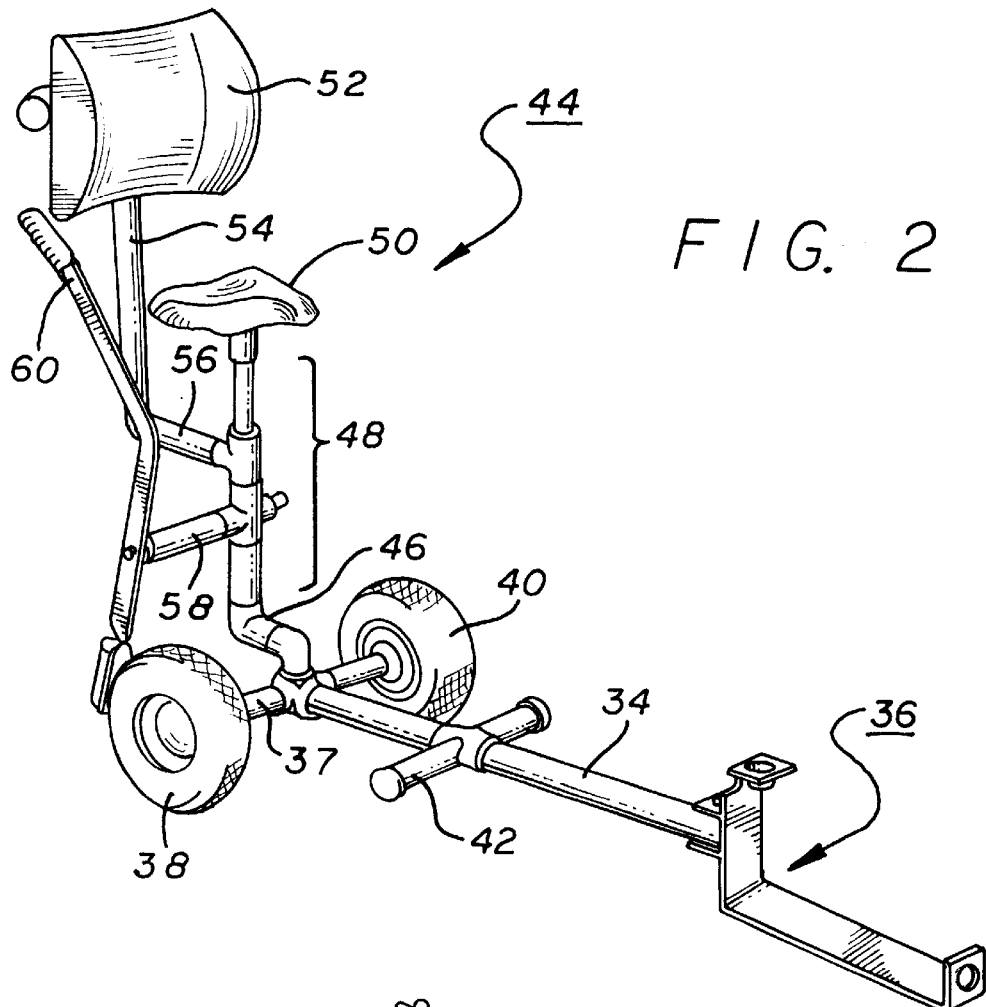
FIG. 2 is a perspective view of the invention.

FIG. 2 is a perspective view of the invention whereby the cart 10 for a golf club bag is converted to the player transport configuration of FIG. 1. The apparatus of the invention includes a tubular base 34 that forms the "backbone" of the apparatus. At its forward end, a bracket 36 is pivotally engaged to the tubular base 34 while, at its rear end, an axle 37 is fixed transverse to the tubular base 34 and supports freely-rotating wheels 38, 40. A foot rest 42 comprises a relatively-short tubular member fixed transverse to an intermediate portion of the base 34.

A seating structure 44 is fixed to the rear end of the base 34. Such structure 44 includes an elbow 46 which joins a first upright tubular section 48 to the base 34. A seat 50 is telescopically joined to the first upright tubular section 48 and is thereby adjustable to accommodate the height of the golfer 26. A back rest 52 is supported by a second upright tubular member 54 that includes an offset section 56 for engaging the first upright tubular member 48. A tubular brake support 58 is transversely fixed to the first upright tubular section 48. A hand brake 60 is pivotally engaged to the end of the support 58.

Figure 3:
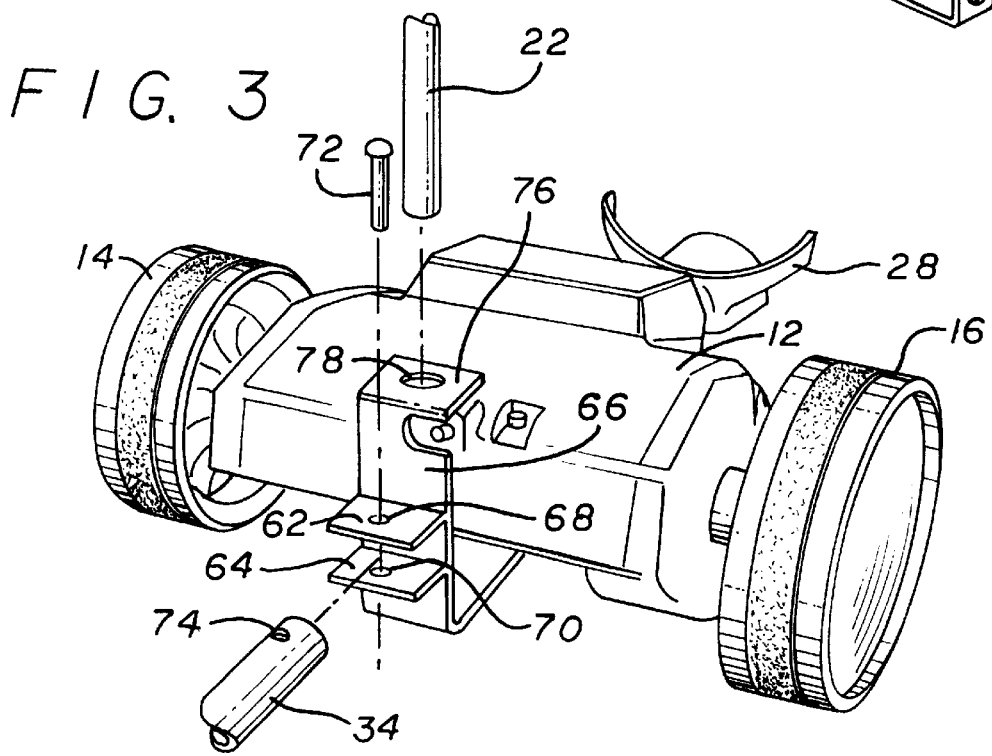
FIG. 3 is an exploded perspective view of the rear portion of the bracket and associated assemblies of the invention.

FIG. 3 is an exploded perspective view of the rear portion and associated assemblies of the bracket 36. As shown, a pair of flanges 62, 64 is fixed to the rear face 66 of the bracket 36 with apertures 68, 70 provided for receiving a pin 72 and an aperture 74 adjacent the end of the tubular base 34. Pivotal engagement of the bracket to the tubular base 34 (and, hence, to the apparatus of the invention) is achieved by inserting the end of the tubular base 34 between the flanges 62 and 64, aligning the apertures 74 with the apertures 68 and 70 and then inserting the pin 72. Thereafter, the base 34 may be pivoted with respect to the longitudinal axis of the pin 72.

A lip 76 is provided at the top of the integral bracket 36 that includes an aperture 78 for passage of an end of the tubular control handle 22. Such handle is received by a vertical cylindrical sheath (not visible in this figure) of the chassis 12. As such, the handle 22 captures the rear of the bracket 36, fixing it to the chassis 12. In addition, the bracket 36 provides a structure that reinforces and stabilizes the connection between the chassis 12 and the control handle 22.

Figure 4:
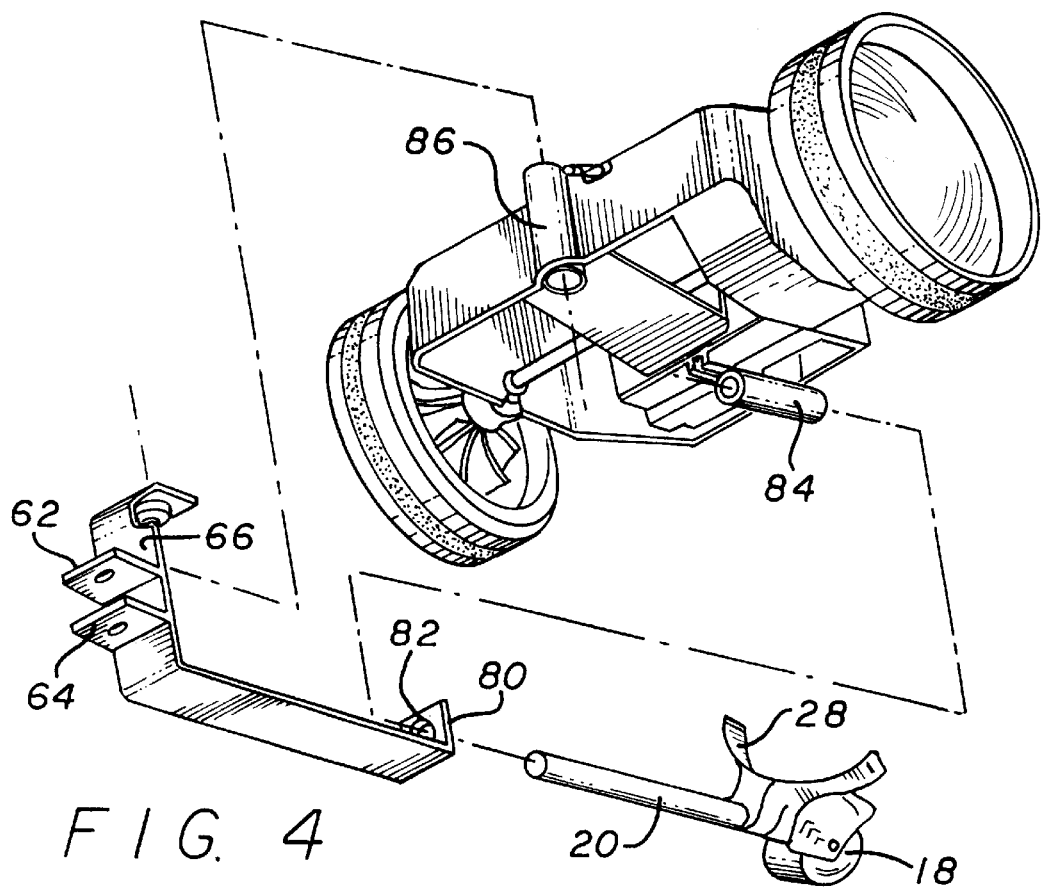
FIG. 4 is an exploded perspective view for illustrating the manner of engagement of the bracket to the bottom of the chassis of a conventional golf bag cart.
Figure 5:
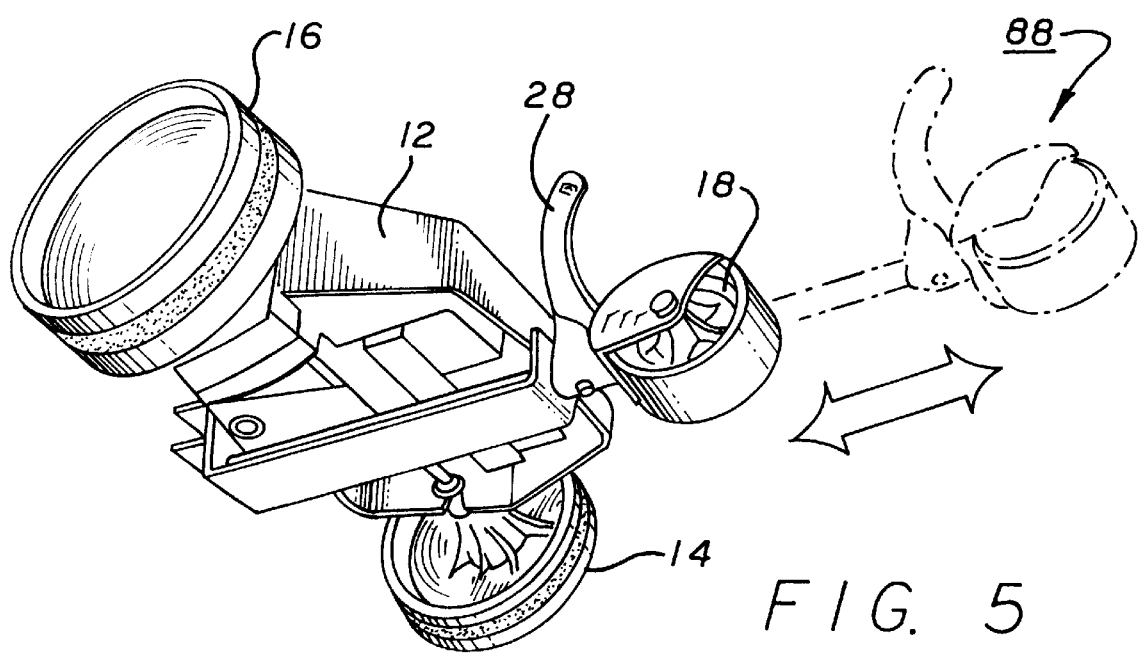
FIG. 5 is a bottom perspective view of the invention as affixed to the chassis of a conventional battery-powered golf cart with the extended configuration of the cart nose wheel shown in shadow outline.

FIG. 4 is an exploded perspective view for further illustrating the manner of engagement of the bracket 36 to the bottom of the chassis 12. As can be seen, a second lip 80 is formed at the front of the generally L-shaped bracket 36. An aperture 82 within the lip 80 permits passage of the nose wheel support 20 into a horizontal cylindrical sheath 84 of the cart 10. (A vertical cylindrical sheath 86 for receiving the tubular handle 22 is provided at the rear of the chassis 12.) Referring to FIG. 5, a bottom perspective view of the assembled invention affixed to the chassis 12, it can be seen that, by interposing the lip 80 between the nose wheel 18 and support 20 and the sheath 84, the front of the bracket 36 is secured to the golf cart 10. As in the case of the lip 76, the lip 80 also serves to stabilize the attachment between the nose wheel support 20 and the chassis 12.

Thus, the present invention provides an inexpensive apparatus for adding a player-carrying capability to a battery-driven golf bag cart of the type that is suitable for use on an executive golf course. The apparatus is readily-disassembled for transport by removing the pin 72 to disengage the base 34 from the chassis 12. As shown in FIG. 5, the presence of the bracket 36 does not interfere with a user's ability to retract the nose wheel 18 for transport from the "in use" configuration 88 indicated by shadow outline.

While this invention has been described with reference to its presently-preferred embodiment, it is not limited thereto. Rather, this invention is limited only insofar as it is defined by the following said of patent claims and includes within its scope all equivalents thereof.

What is claimed is:

1. Apparatus for converting a battery-powered golf bag cart of the type that includes a chassis having at least one pair of wheels fixed thereto, said apparatus comprising, in combination:

a) a frame comprising an elongated tubular base having (i) a first upright tubular section, (ii) a second upright tubular section having an offset portion and (iii) said offset portion being fixed to said first upright tubular section;

b) an axle fixed transverse to and at a first end of said tubular base;

c) a pair of wheels rotatably fixed to opposed ends of said axle;

d) a seat mounted atop said first upright tubular section;

e) a hand brake pivotally engaged to said seat structure, said hand brake including (i) a tubular brake support fixed transverse to said first upright tubular section and (ii) said hand brake being pivotally engaged to an end of said brake support;

f) a bracket for engaging the chassis of a golf bag cart fixed to an opposed second end of said tubular base;

g) a foot rest fixed transverse to and intermediate said first and second ends of said tubular base; and h) a back rest fixed to said second upright tubular section.

2. Apparatus for converting a battery-powered golf bag cart of the type that includes a chassis having at least one pair of wheels fixed thereto, said apparatus comprising, in combination:

a) a frame comprising an elongated tubular base;

b) an axle fixed transverse to and at a first end of said tubular base;

c) a pair of wheels rotatably fixed to opposed ends of said axle;

d) a seat structure fixed to said end of said tubular base;

e) a bracket comprising an integral, generally L-shaped member for engaging the chassis of a golf bag cart fixed to an opposed second end of said tubular base; and f) said integral member including (i) lips orthogonal to opposed ends of an L-shaped section and (ii) said lips having internal apertures for receiving a nose wheel strut and a control handle of a golf bag cart.

3. Apparatus as defined in claim 2 further including means for pivotally engaging said bracket to said tubular base.

4. Apparatus as defined in claim 3 wherein said means for pivotally engaging said bracket to said tubular base further includes:

a) a pair of flanges fixed to said bracket; and b) said flanges being fixed parallel to one another at the back wall of said integral L-shaped section for pivotally receiving said second end of said tubular base.

5. Apparatus as defined in claim 4 further including:

a) an aperture through said second end of said tubular base;

b) aligned apertures through said flanges;

c) said apertures through said flanges being arranged to align with said aperture through said second end of said tubular base when said base is engaged to said bracket; and d) a pin received within said aligned apertures for pivotally securing said tubular base to said bracket.

* * * * *